3,536,702
3-AMINOALKYL-4,1,3-BENZOTHIADIAZEPIN-
2-(1H,3H)-ONE 4,4-DIOXIDES
Shin Hayao, Elkhart, Ind., assignor to Miles Laboratories,
Inc., Elkhart, Ind., a corporation of Indiana
No Drawing. Filed Sept. 21, 1967, Ser. No. 669,370
Int. Cl. C07d 93/42
U.S. Cl. 260—239.3                   1 Claim

ABSTRACT OF THE DISCLOSURE

A series of 3 - aminoalkyl - 4,1,3 - benzothiadiazepin-2(1H,3H)-one 4,4-dioxides having beneficial sedative and analgesic properties. Prepared by reacting an o-nitrophenylmethanesulfonyl halide with an aminoalkylamine, reducing the resulting compound to form ω-(o-aminophenylmethanesulfonamido)alkylamine, and closing the ring of the latter compound to form the desired compound.

---

This invention relates to a novel series of chemical compounds having beneficial pharmacological properties. More particularly, this invention relates to 3-aminoalkyl-4,1,3-benzothiadiazepin-2(1H,3H)-one 4,4-dioxides and a process for the preparation of such compounds.

The new compounds of this invention may be represented by the structural formula:

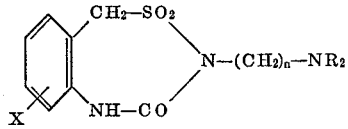

In this formula X is a member selected from the group consisting of hydrogen, halogen, lower alkyl, lower alkoxy and hydroxy, n is an interger between about 0 and 6, and $NR_2$ is a member selected from the group consisting of dialkylamino, morpholinyl, piperidyl, 4-arylpiperazinyl, 4-aralkylpiperazinyl, 4-arylpiperidyl and 4-hydroxy-4 arylpiperidyl. For compounds of this invention, lower alkyls preferably have between about 1 and 3 carbon atoms and the aryls are advantageously phenyl or substituted phenyl.

Compounds of this invention may be prepared as free bases and beneficially are prepared as pharmacologically acceptable non-toxic, acid addition salts having greater solubility in aqueous solutions. Salts may be formed from mineral acids such as hydrochloric acid, hydrobromic acid and sulfuric acid or organic acids such as citric acid, maleic acid or similar acids suitable for preparing pharmacologically acceptable salts. Preparation of such salts will be described in the accompanying example and will not be set forth at this point.

3-aminoalkyl - 4,1,3 - benzothiadiazepin-(1H,3H)-one 4,4-dioxides of this invention may be prepared by reacting an o-nitrophenylmethanesulfonyl halide with an aminoalkylamine having the desired $NR_2$ group. Typically, modified Schotten-Baumann reaction conditions are beneficially used for this preparation. Although the reaction conditions are not considered critical, the reaction is advantageously carried out in an inert solvent, for example chloroform or benzene, in the presence of a base. One skilled in the art will readily recognize other solvents and many bases that may be effectively used. Beneficially the reactants are mixed slowly with stirring and stirred after mixing until the reaction is complete and an ω-(o-nitrophenylmethanesulfonamido)alkylamine is formed.

The ω-(o-nitrophenylmethanesulfonamido)alkylamine is then reduced to form a corresponding o-amino derivative. This reduction is beneficially carried out in the presence of hydrogen with a palladium on charcoal catalyst. The ω - o( - nitrophenylmethanesulfonamido)alkylamine may be dissolved in glacial acetic acid and then hydrogenated at about 25° C. for about 20 minutes. Other catalysts such as platinum oxide and Raney Nickel may be used instead of palladium and the reaction time and conditions may be varied, as they are not believed to be critical.

Ring closure may then be effected to form the desired 3-alkylamino-4,1,3-benzothiadiazepin-2(1H,3H)-one 4,4-dioxide. To effect the ring closure, the amine formed in the reduction may be added to a cold solution of a suitable unreactive solvent and a ring closing reagent such as phosgene or ethylchloroformate. At higher temperatures without a solvent, urea may be used to effect this ring closure. The resulting mixture may then be stirred and refluxed for a period of time sufficient to allow completion of the reaction. Chlorobenzene, toluene, and dioxane are examples of suitable solvents that may be used. Reactions times in excess of two hours are preferred to permit completion of the reaction and the formation of the desired compound.

The preparation of these compounds as described may be represented by the chemical equation:

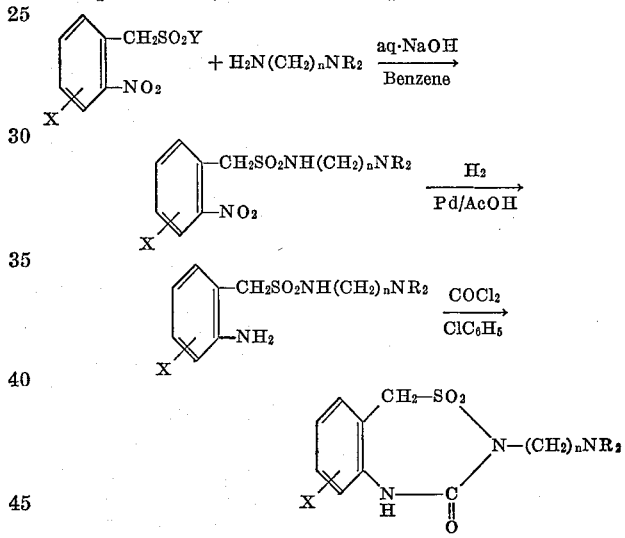

In this equation Y is a halogen and the other groups have values as previously described. Specific reagents have been shown for clarity in this equation. However, it is understood that these reagents are not to be construed as limitations thereon.

Medications may be prepared with these compounds as active ingredients using fillers, carriers, extenders, and excipients generally used in pharmaceutical formulations. The active ingredient may be in the form of the free base and is preferably in the form of the pharmacologically acceptable acid addition salt. Medications may be prepared in solid or liquid states as tablets, capsules, suspensions, and similar dosage forms suitable for oral, subcutaneous, intraperitoneal, and other convenient means of administration. The active ingredient may be mixed with common diluents or tableting adjuncts such as cellulose powder, cornstarch, lactose, talc, and such, according to accepted manufacturing practices. Unit dosages of active ingredient in the medication may be varied so that an adequate amount is present to provide desired thereapeutic results without untoward side effects and to permit satisfactory variations in dosages administered. These medications are preferably prepared according to accepted phamaceutical practices.

The novel compounds of this invention demonstrate beneficial pharmacological properties. These compounds have shown desirable analgesic and sedative activity, particularly in mammals.

Analgesia was observed in eight of twenty mice in a test group with a dose of 29 mg./kg. of active ingredient administered subcutaneously. This medication included 3-[3-(4-phenyl-1-piperazinyl)propyl] - 4,1,3 - benzothiadiazepin-2(1H,3H)-one 4,4-dioxide dihydrochloride as an active ingredient in an aqueous solution. Analgesia was determined in the test animals substantially by Haffner's artery clip method as described by Bianchi, C. and Franceschini, J. in "Experimental Observations On Haffner's Method For Testing Analgesic Drugs," Brit. J. Pharmacol., 9, 280 (1954).

Toxicity of this active ingredient was determined by administering graduated doses thereof in an aqueous solution intraperitoneally to a group of mice. The $LD_{50}$ dose, the dose at which there was 50% mortality, was determined to be 68.1 mg./kg. Sedation of the animals was noted at doses of 10.0 and 21.5 mg./kg.

The invention will be further understood by reference to the following example which describes the preparation of one of the compounds of this invention. This example is merely representative and one skilled in the art will be able to facilely determine therefrom how to prepare the other compounds of this invention as set forth in the appended claims.

EXAMPLE

3-[3-(4-phenyl-1-piperazinyl)propyl]-4,1,3-benzothiadiazepin-2(1H,3H)-one 4,4-dioxide dihydrochloride (A) 1([3-(o-nitrophenylmethanesulfonamido)propyl]-4-phenylpiperazine.—To a solution of 1-(3-aminopropyl)-4-phenylpiperazine (32.0 g., 0.146 mole) in 100 ml. of chloroform and 50 ml. of 20% sodium hydroxide solution was added a solution of o-nitrophenylmethanesulfonyl chloride (34.3 g., 0.146 mole) in 100 ml. of chloroform during 60 minutes with stirring to give a yellow milkyl solution with a small amount of solid. The reaction mixture was stirred for an additional 60 minutes and acidified with dilute hydrochloric acid and then made basic with aqueous ammonia. The organic layer was separated and the aqueous layer was extracted with chloroform and with ether. The combined extracts were dried and the solvent was removed in vacuo to give an amber syrup which was triturated with n-hexane to give a yellow sticky solid. The solid was dissolved in 2-propanol and saturated with dry hydrogen chloride to give a white gelatinous solid which could not be collected by suction. The gelatinous mixture was dissolved in hot aqueous methanol, filtered and concentrated to smaller volume. Ethyl acetate was added to give a colorless solid of M.P. 255–257° C. (dec.) with softening at 200° C. and partial melting at 210–215° C., yield 32.6 g. The hydrochloride was suspended in water to give a yellow gum which was made basic with aqueous ammonia to give a pale yellow solid. The solid was extracted with chloroform, the extract was dried, and the solvent was removed in vacuo to give an amber syrup which was tritrated with n-hexane. The resulting bright yellow solid melted at 116–123° C., yield 32.2 g. The bright yellow solid was once recrystallized from benzene-n-hexane to give a yellow solid of M.P. 123–125° C., yield 26.0 g.

$\nu_{max.}^{CHCl_3}$: 1535 (C—NO$_2$) 1360 and 1330 (C—NO$_2$ and/or SO$_2$NH—) and 1150 cm$^1$ (—SO$_2$NH—).

Analysis.—Calcd. for $C_{20}H_{26}N_4O_4S$ (percent): N, 13.4. Found (percent): N, 13.1.

(B) 1-[3-(o-aminophenylmethanesulfonamido)propyl]-4-phenylpiperazine.—A solution of 1-[3-(o-nitrophenylmehanesulfonamido)propyl]-4-phenylpiperazine (25.7 g., 0.0615 mole) in 150 ml. of glacial acetic acid was hydrogenated with 3.0 g. of palladium on charcoal catalyst (10% by weight) under 50 lb. of hydrogen at 25° C. It took up 16 lb. (calcd. 14.8 lb.) of hydrogen in 20 minutes. The catalyst was removed, the solution concentrated in vacuo and the residue treated with aqueous ammonia to give a light tan oil which soon solidified. The solid was collected, washed with water and dried, M.P. 142–149° C., yield 23.5 g. The solid was twice recrystallized from chloroform-n-hexane to give a colorless solid of M.P. 149–151° C.

$\nu_{max.}^{CHCl_3}$: 3450 and 3370 (NH$_2$, NH), 1640 (NH$_2$), 1330 and 1320 (doublets, —SO$_2$NH), 1150 cm.$^{-1}$ (—SO$_2$NH)

Analysis.—Calcd. for $C_{20}H_{28}N_4O_2S \cdot H_2O$ (percent): N, 13.79. Found (percent): N, 13.59, 13.77.

(C) 3-[3-(4-phenyl-1-piperazinyl)propyl]-4,1,3-benzothiadiazepin-2(1H,3H)-one 4,4-dioxide dihydrochloride.—To ice-cold chlorobenzene (150 ml.) containing 73.6 g. (0.745 mole) of phosgene was added 25.7 g. (0.066 mole) of 1 - [3-(o-aminophenylmethanesulfonamido)propyl]-4-phenylpiperazine all at once. The resulting suspension was stirred at 25° C. for one hour and then refluxed for one hour. The reaction mixture was cooled. The solid product collected, washed with ethyl acetate-ether and dried in air, M.P. 202–205° C. (dec.), yield 28.6 g. (89%). The solid product was once recrystallized from aqueous methanolic hydrogen chloride to give a buff colored solid of M.P. 203–205° C. (dec.), yield 24.5 g.

$\nu_{max.}^{KCl}$: 1700 (amide C=O), 1345 and 1145 cm.$^{-1}$ (—SO$_2$N—), no amide II band.

Analysis.—Calcd. for $C_{21}H_{26}N_4SO_3 \cdot 2HCl$ (percent): C, 51.7; H, 5.57; N, 11.5. Found (percent): C, 51.8; H, 5.98; N, 11.2.

What is claimed is:
1. A compound selected from 3-[3-(4-phenyl-1-piperazinyl)propyl] - 4,1,3 - benzothiadiazepin-2(1H,3H)-one 4,4-dioxide or pharmacologically acceptable salts thereof.

References Cited
FOREIGN PATENTS 1,111,199   7/1961   Germany.

HENRY R. JILES, Primary Examiner

R. T. BOND, Assistant Examiner

U.S. Cl. X.R.

424—244